United States Patent
Xu et al.

(10) Patent No.: US 10,152,424 B1
(45) Date of Patent: Dec. 11, 2018

(54) WRITE REDUCTION SYSTEM AND METHOD

(71) Applicant: EMC CORPORATION, Hopkinton, MA (US)

(72) Inventors: Xinlei Xu, Beijing (CN); Charles Hopkins, Upton, MA (US); John V. Harvey, Wrentham, MA (US); Xiongcheng Li, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 144 days.

(21) Appl. No.: 14/871,698

(22) Filed: Sep. 30, 2015

(51) Int. Cl.
*G06F 12/0888* (2016.01)
*G06F 12/02* (2006.01)

(52) U.S. Cl.
CPC ...... *G06F 12/0888* (2013.01); *G06F 12/0246* (2013.01); *G06F 2212/1032* (2013.01); *G06F 2212/1044* (2013.01); *G06F 2212/154* (2013.01); *G06F 2212/222* (2013.01); *G06F 2212/608* (2013.01)

(58) Field of Classification Search
CPC ............. G06F 12/0888; G06F 12/0246; G06F 2212/1032; G06F 2212/1044; G06F 2212/154; G06F 2212/222; G06F 2212/608
See application file for complete search history.

(56) References Cited

U.S. PATENT DOCUMENTS

| | | | |
|---|---|---|---|
| 2010/0125694 A1* | 5/2010 | Choi | G06F 12/0246 711/1 |
| 2011/0258391 A1* | 10/2011 | Atkisson | G06F 11/108 711/118 |
| 2013/0124794 A1* | 5/2013 | Bux | G06F 12/0246 711/103 |
| 2014/0095758 A1* | 4/2014 | Smith | G06F 3/0613 710/308 |
| 2015/0324294 A1* | 11/2015 | Ogawa | G06F 12/0871 711/118 |
| 2015/0347026 A1* | 12/2015 | Thomas | G06F 3/0611 711/103 |

* cited by examiner

*Primary Examiner* — Nanci N Wong
(74) *Attorney, Agent, or Firm* — Brian J. Colandreo; Mark H. Whittenberger; Holland & Knight LLP

(57) ABSTRACT

A method, computer program product, and computing system for reducing write operations on a flash-based cache memory system includes writing user data to a flash-based cache memory system. Initial status metadata concerning the user data is written to a RAM-based memory system. The user data is written to a backend storage system. Mapping metadata concerning the user data is written to the flash-based cache memory system.

9 Claims, 4 Drawing Sheets

WRITE REDUCTION SYSTEM AND METHOD

TECHNICAL FIELD

This disclosure relates to storage systems and, more particularly, to systems and methods for safeguarding data.

BACKGROUND

Storing and safeguarding electronic content is of paramount importance in modern business. Accordingly, various systems may be employed to protect such electronic content. Different methodologies may be employed to expedite the access to such electronic content, one is which may be the use of cache systems. During the course of using such cache systems, the content of these cache systems may need to be repeatedly overwritten. Unfortunately, such repetitious overwrite operations may prematurely wear flash-based cache memory systems.

SUMMARY OF DISCLOSURE

In one implementation, a computer-implemented method, for reducing write operations on a flash-based cache memory system, includes writing user data to a flash-based cache memory system. Initial status metadata concerning the user data is written to a RAM-based memory system. The user data is written to a backend storage system. Mapping metadata concerning the user data is written to the flash-based cache memory system.

One or more of the following features may be included. Updated status metadata concerning the user data may be written to the RAM-based memory system in response to the user data being written to the backend storage system. The flash-based cache memory system may include a plurality of solid state disks. The RAM-based memory system may be a persistent RAM-based memory system. The mapping metadata may locate the user data within one or more of: the flash-based cache memory system, and the backend storage system. The initial status metadata may define the user data as dirty user data. The updated status metadata may define the user data as clean user data.

In another implementation, a computer program product resides on a computer readable medium and has a plurality of instructions stored on it. When executed by a processor, the instructions cause the processor to perform operations including writing user data to a flash-based cache memory system. Initial status metadata concerning the user data is written to a RAM-based memory system. The user data is written to a backend storage system. Mapping metadata concerning the user data is written to the flash-based cache memory system.

One or more of the following features may be included. Updated status metadata concerning the user data may be written to the RAM-based memory system in response to the user data being written to the backend storage system. The flash-based cache memory system may include a plurality of solid state disks. The RAM-based memory system may be a persistent RAM-based memory system. The mapping metadata may locate the user data within one or more of: the flash-based cache memory system, and the backend storage system. The initial status metadata may define the user data as dirty user data. The updated status metadata may define the user data as clean user data.

In another implementation, a computing system including a processor and memory is configured to perform operations including writing user data to a flash-based cache memory system. Initial status metadata concerning the user data is written to a RAM-based memory system. The user data is written to a backend storage system. Mapping metadata concerning the user data is written to the flash-based cache memory system.

One or more of the following features may be included. Updated status metadata concerning the user data may be written to the RAM-based memory system in response to the user data being written to the backend storage system. The flash-based cache memory system may include a plurality of solid state disks. The RAM-based memory system may be a persistent RAM-based memory system. The mapping metadata may locate the user data within one or more of: the flash-based cache memory system, and the backend storage system. The initial status metadata may define the user data as dirty user data. The updated status metadata may define the user data as clean user data.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
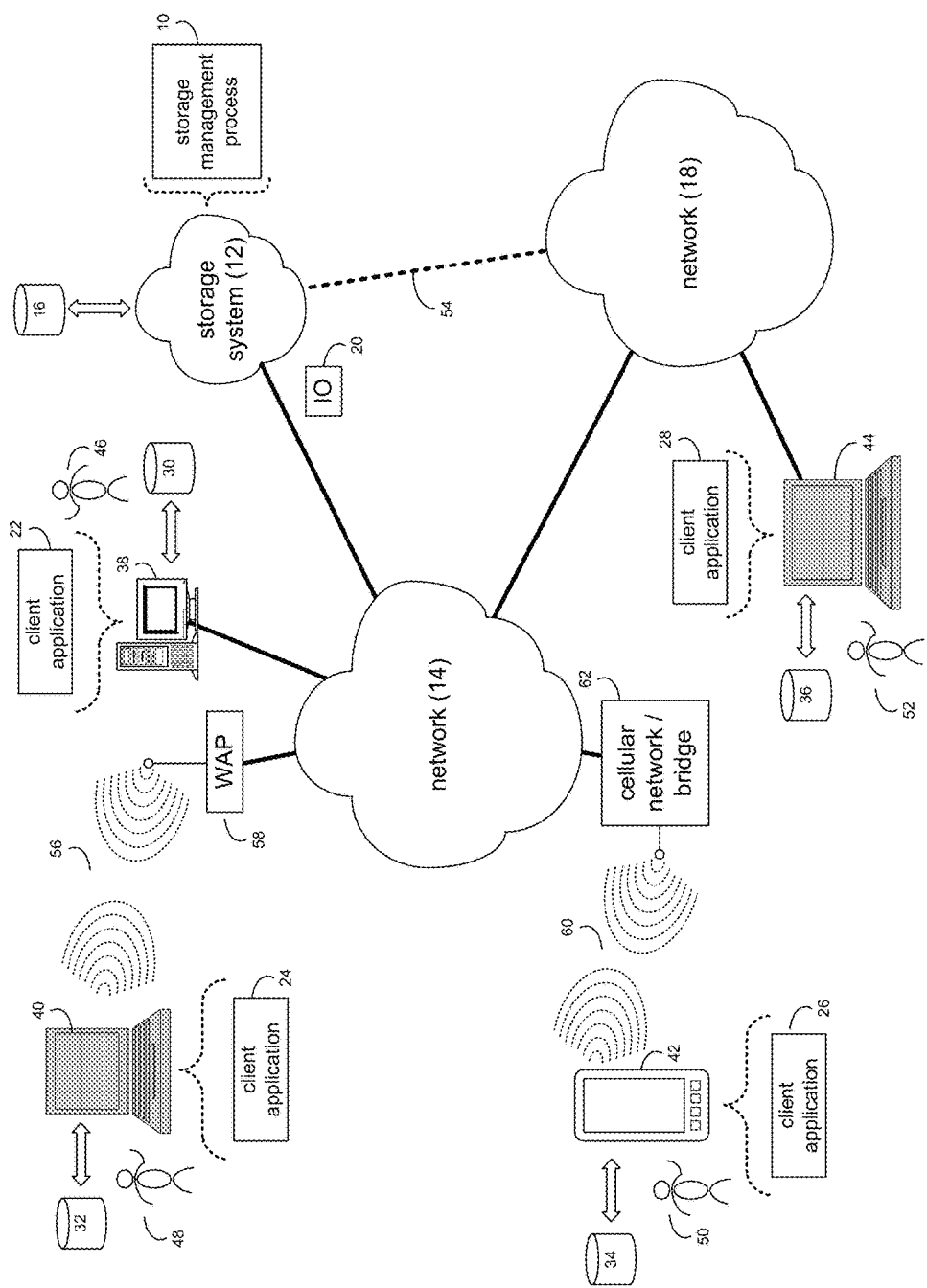
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of electro-mechanical backend storage devices. However, this is for illustrative purposes only and is not intended to be a limitation of this disclosure, as other configurations are possible and are considered to be within the scope of this disclosure.

Figure 2:
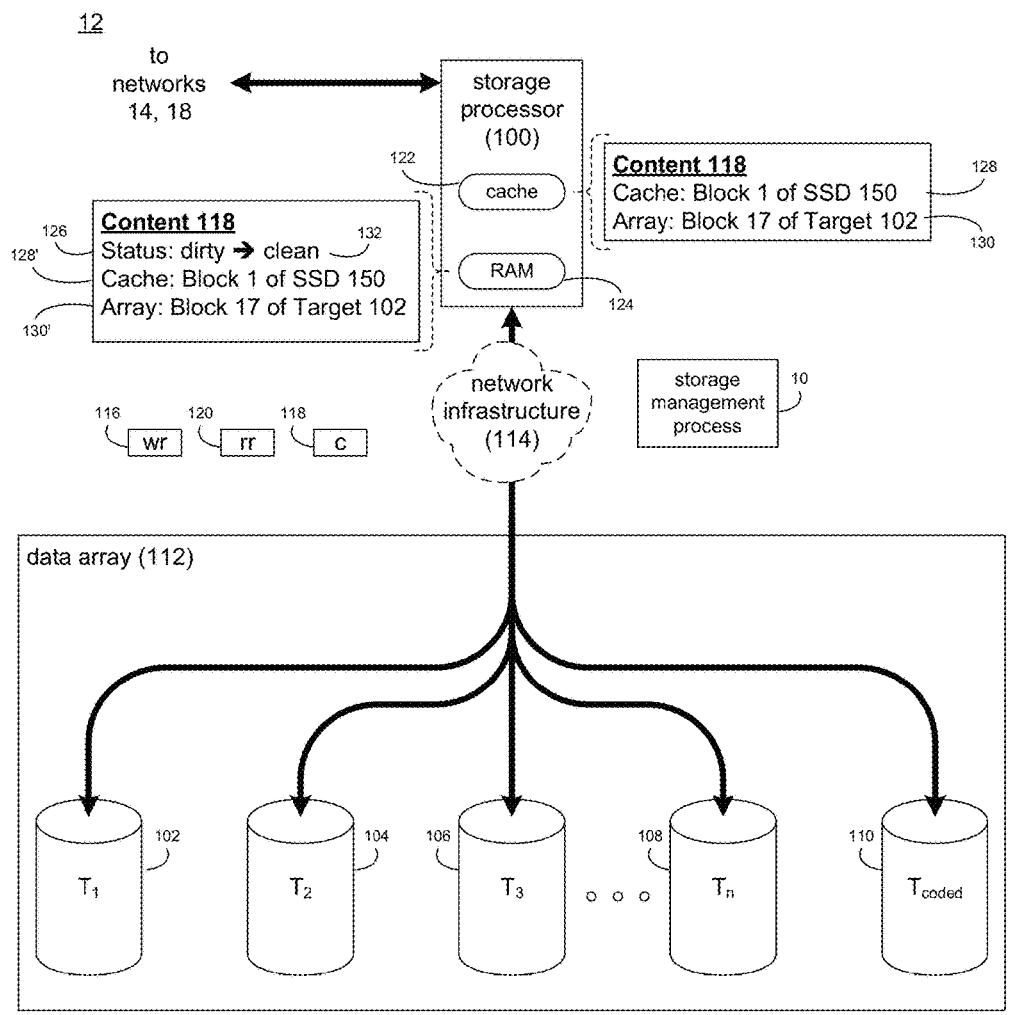
FIG. 2 is a diagrammatic view of the storage system of FIG. 1.

Referring also to FIG. 2, storage system 12 may include storage processor 100 and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for illustrative purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for illustrative purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/Flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. An example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within data array 112.

Storage processor 100 may include cache memory system 122. Examples of cache memory system 122 may include but are not limited to a volatile, solid-state, cache memory system (e.g., a dynamic RAM cache memory system) and/or a non-volatile, solid-state, cache memory system (e.g., a flash-based, cache memory system).

During operation of storage processor 100, content 118 to be written to storage system 12 may be received by storage processor 100. Additionally/alternatively and when storage processor 100 is configured as an application server, content 118 to be written to storage system 12 may be internally generated by storage processor 100.

As will be discussed below in greater detail, storage processor 100 may initially store content 118 within cache memory system 122. Depending upon the manner in which cache memory system 122 is configured, storage processor 100 may immediately write content 118 to data array 112 (if cache memory system 122 is configured as a write-through cache) or may subsequently write content 118 to data array 112 (if cache memory system 122 is configured as a write-back cache).

Figure 3:
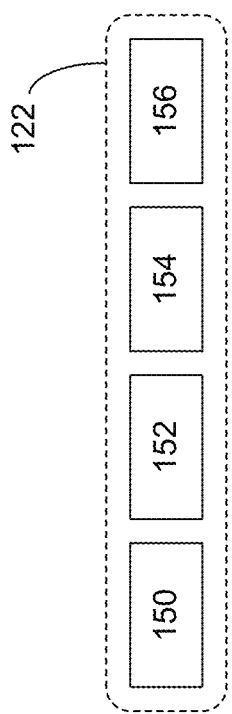
FIG. 3 is a diagrammatic view of a cache system for use within the storage system of FIG. 2.

The Storage Management Process:

Referring also to FIG. 3 and for the following discussion, assume that cache memory system 122 is a flash-based cache system. Being that cache memory system 122 is a flash-based cache system, cache memory system 122 may be constructed from a plurality of solid-state disks. For example, if cache memory system 122 is a 2.0 terabyte, solid-state cache system, cache memory system 122 may be constructed of four 512 gigabyte solid-state disks (e.g., SSDs 150, 152, 154, 156).

Storage management process 10 may be configured to reduce the number of write operations performed on cache memory system 122. For example, assume that write request 116 is received by storage management process 10, requesting that content 118 be written onto storage system 12.

Figure 4:
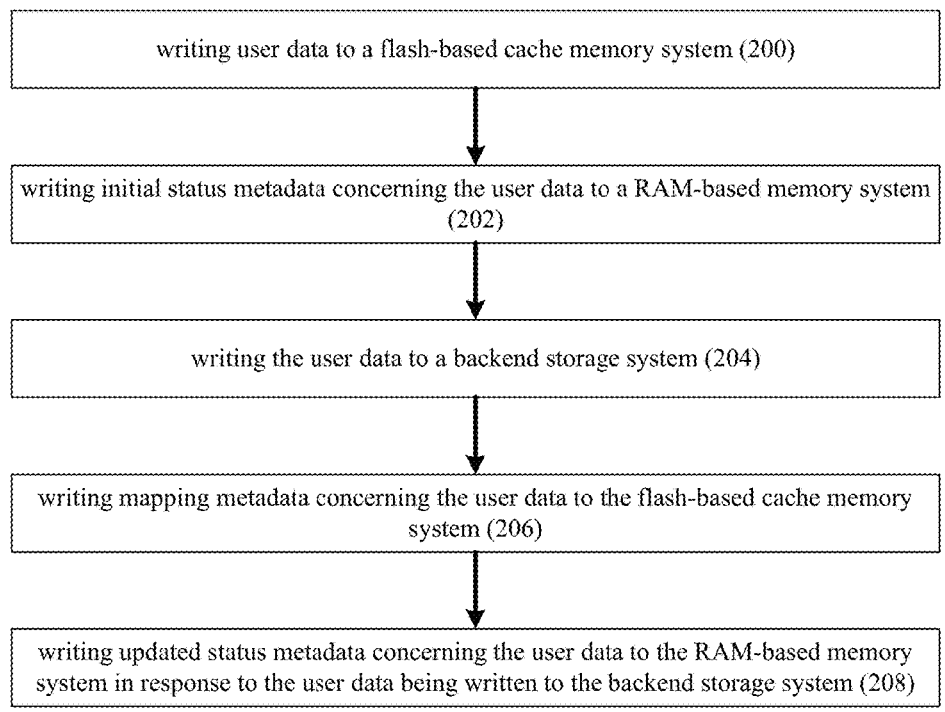
FIG. 4 is a flow chart of one implementation of the storage management process of FIG. 1.

Referring also to FIG. 4 and upon receiving write request 116, storage management process 10 may write 200 the user data (e.g., content 118) to cache memory system 122. For example, assume that storage management process 10 writes 200 content 118 to memory block 0001 of SSD 150 within cache memory system 122. At this point in time, being that content 118 is stored within storage system 12, storage management process 10 may acknowledge to the generator of write request 116 that content 118 was stored within storage system 12.

Assume that included within storage processor 100 is RAM-based memory system 124. RAM-based memory system 124 may include non-persistent RAM-based storage and/or persistent RAM-based storage. As is known in the art, non-persistent RAM-based storage is RAM-based storage that will lose its data in the event of e.g., a power failure. Further and as is known in the art, persistent RAM-based storage is RAM-based storage that will not lose its data in the event of e.g., a power failure. Persistent RAM-based storage may be accomplished using various methodologies, such as incorporating an independent battery backup that will maintain the content stored within the RAM-based storage system during a power failure; or utilizing procedures that will rebuild the content stored within the RAM-based storage system after recovery from a power failure.

Continuing with the above-stated example, storage management process 10 may write 202 initial status metadata 126 concerning the user data (e.g., content 118) to RAM-based memory system 124. In most implementation, initial status metadata 126 may be written to persistent RAM-based storage within RAM-based memory system 124. Initial status metadata 126 may define whether or not content 118 was written to (in this example) data array 112. As content 118 has only been written 200 to cache memory system 122, initial status metadata 126 may define the user data (e.g., content 118) as being dirty user data (i.e., data that has not yet been written to the backend storage, namely data array 112).

Storage management process 10 may write 204 the user data (e.g., content 118) to a backend storage system (e.g., data array 112). For example, assume for illustrative purposes that storage management process 10 writes 204 content 118 to memory block 0017 of storage target 102 within data array 112.

Storage management process 10 may write 206 mapping metadata 128, 130 concerning the user data (e.g., content 118) to flash-based cache memory system 122. Mapping metadata 128, 130 may be configured to locate content 118 within flash-based cache memory system 122 and the backend storage (e.g., data array 112). For example, mapping metadata 128 may define that content 118 is stored at memory block 0001 of SSD 150 within cache memory system 122 and mapping metadata 130 may define that content 118 is stored at memory block 0017 of storage target 102 within data array 112.

Further, storage management process 10 may write a redundant copy of mapping metadata 128, 130 (in the form of mapping metadata 128', 130') to RAM-based memory system 124. In the event that mapping metadata 128', 130' is stored on non-persistent RAM-based storage within RAM-based memory system 124, in the event of a power failure, mapping metadata 128', 130' may be recovered from mapping metadata 128, 130 stored within flash-based cache memory system 122.

Once content 118 is written to the backend storage system (e.g., data array 112), storage management process 10 may write 208 updated status metadata 132 concerning the user data (e.g., content 118) to RAM-based memory system 124. Specifically, as content 118 is now written to data array 112, updated status metadata 132 may now define the user data (e.g., content 118) as clean user data.

As shown above, by writing status metadata 126, 132 to RAM-based memory system 124 and not to cache memory system 122, two write cycles of cache memory system 122 may be avoided, thus reducing wear on this flash-based cache memory system.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, for reducing write operations on a flash-based cache memory system, comprising:
   generating a write request for storing user data within a storage system, wherein the write request is generated by a storage processor communicatively coupled to a backend storage system within the storage system, wherein the storage processor comprises a flash-based cache memory system and a RAM-based storage system including a non-persistent RAM-based storage and a persistent RAM-based storage;
   writing the user data to the flash-based cache memory system of the storage processor;
   acknowledging to a generator of the write request when the user data is stored within the flash-based cached memory system;
   writing initial status metadata concerning the user data, indicating that the user data is dirty, to the persistent RAM-based storage within the RAM-based memory system of the storage processor;
   writing the user data to the backend storage system of the storage system;
   writing updated status metadata concerning the user data, indicating that the user data is clean, to the persistent RAM-based storage within the RAM-based memory system in response to the user data being written to the backend storage system;
   writing mapping metadata concerning the user data to the flash-based cache memory system;
   writing a redundant copy of the mapping metadata stored within the flash-based cache memory system to the non-persistent RAM-based storage within the RAM-based memory system, wherein the updated status metadata is not written to the non-persistent RAM-based storage; and
   recovering the redundant copy of the mapping metadata stored within the non-persistent RAM-based storage within the RAM-based memory system from the mapping metadata stored within the flash-based cache memory system in response to a power failure of the non-persistent RAM-based storage within the RAM-based memory system.

2. The computer-implemented method of claim 1 wherein the flash-based cache memory system includes a plurality of solid state disks.

3. The computer-implemented method of claim 1 wherein the mapping metadata locates the user data within one or more of:
   the flash-based cache memory system, and
   the backend storage system.

4. A computer program product residing on a non-transitory computer readable medium having a plurality of instructions stored thereon which, when executed by a processor, cause the processor to perform operations comprising:
   generating a write request for storing user data within a storage system, wherein the write request is generated by a storage processor communicatively coupled to a backend storage system within the storage system, wherein the storage processor comprises a flash-based cache memory system and a RAM-based storage system including a non-persistent RAM-based storage and a persistent RAM-based storage;
   writing the user data to the flash-based cache memory system of the storage processor;
   acknowledging to a generator of the write request when the user data is stored within the flash-based cached memory system;
   writing initial status metadata concerning the user data, indicating that the user data is dirty, to the persistent RAM-based storage within the RAM-based memory system of the storage processor;
   writing the user data to the backend storage system of the storage system;
   writing updated status metadata concerning the user data, indicating that the user data is clean, to the persistent RAM-based storage within the RAM-based memory system in response to the user data being written to the backend storage system;
   writing mapping metadata concerning the user data to the flash-based cache memory system;
   writing a redundant copy of the mapping metadata stored within the flash-based cache memory system to the non-persistent RAM-based storage within the RAM-based memory system, wherein the updated status metadata is not written to the non-persistent RAM-based storage; and
   recovering the redundant copy of the mapping metadata stored within the non-persistent RAM-based storage within the RAM-based memory system from the mapping metadata stored within the flash-based cache memory system in response to a power failure of the non-persistent RAM-based storage within the RAM-based memory system.

5. The computer program product of claim 4 wherein the flash-based cache memory system includes a plurality of solid state disks.

6. The computer program product of claim 4 wherein the mapping metadata locates the user data within one or more of:
   the flash-based cache memory system, and
   the backend storage system.

7. A computing system including a processor and memory configured to perform operations comprising:

generating a write request for storing user data within a storage system, wherein the write request is generated by a storage processor communicatively coupled to a backend storage system within the storage system, wherein the storage processor comprises a flash-based cache memory system and a RAM-based storage system including a non-persistent RAM-based storage and a persistent RAM-based storage;

writing the user data to the flash-based cache memory system of the storage processor;

acknowledging to a generator of the write request when the user data is stored within the flash-based cached memory system;

writing initial status metadata concerning the user data, indicating that the user data is dirty, to the persistent RAM-based storage within the RAM-based memory system of the storage processor;

writing the user data to the backend storage system of the storage system;

writing updated status metadata concerning the user data, indicating that the user data is clean, to the persistent RAM-based storage within the RAM-based memory system in response to the user data being written to the backend storage system;

writing mapping metadata concerning the user data to the flash-based cache memory system;

writing a redundant copy of the mapping metadata stored within the flash-based cache memory system to the non-persistent RAM-based storage within the RAM-based memory system, wherein the updated status metadata is not written to the non-persistent RAM-based storage; and recovering the redundant copy of the mapping metadata stored within the non-persistent RAM-based storage within the RAM-based memory system from the mapping metadata stored within the flash-based cache memory system in response to a power failure of the non-persistent RAM-based storage within the RAM-based memory system.

8. The computing system of claim 7 wherein the flash-based cache memory system includes a plurality of solid state disks.

9. The computing system of claim 7 wherein the mapping metadata locates the user data within one or more of:
   the flash-based cache memory system, and
   the backend storage system.

* * * * *